United States Patent
Bhimani et al.

(10) Patent No.: US 7,331,483 B2
(45) Date of Patent: Feb. 19, 2008

(54) BEVERAGE DISPENSER

(75) Inventors: Alan Bhimani, Birmingham (GB); Richard Nighy, Stratford Upon Avon (GB); Hugh Christopher Bramley, Rugeley (GB)

(73) Assignee: IMI Vision Limited, Warwickshire (GB)

( * ) Notice: Subject to any disclaimer, the term of this patent is extended or adjusted under 35 U.S.C. 154(b) by 540 days.

(21) Appl. No.: 10/926,491

(22) Filed: Aug. 26, 2004

(65) Prior Publication Data
US 2006/0043101 A1 Mar. 2, 2006

(51) Int. Cl.
*B67B 7/00* (2006.01)
(52) U.S. Cl. ............................. 222/1; 222/52; 222/56; 222/64; 222/129.1; 222/145.5; 222/145.6
(58) Field of Classification Search ................ 222/148, 222/145.5, 145.6, 1, 129.1, 133, 129.2, 134, 222/129.3, 135, 129.4, 52, 56, 59, 64, 504
See application file for complete search history.

(56) References Cited

U.S. PATENT DOCUMENTS

| | | | | |
|---|---|---|---|---|
| 3,159,190 A | * | 12/1964 | Skiera et al. | 141/369 |
| 3,591,051 A | * | 7/1971 | Mitchell et al. | 222/56 |
| 4,886,190 A | * | 12/1989 | Kirschner et al. | 222/57 |
| 5,381,926 A | * | 1/1995 | Credle et al. | 222/1 |
| 5,842,603 A | * | 12/1998 | Schroeder et al. | 222/23 |
| 5,931,343 A | * | 8/1999 | Topar et al. | 222/56 |
| 5,975,357 A | * | 11/1999 | Topar | 222/56 |
| 6,435,375 B2 | * | 8/2002 | Durham et al. | 222/129.1 |
| 6,450,369 B1 | * | 9/2002 | Heyes | 222/129.1 |
| 6,837,397 B2 | * | 1/2005 | Lassota | 222/129.3 |

* cited by examiner

*Primary Examiner*—Frederick C. Nicolas
(74) *Attorney, Agent, or Firm*—Pyle & Piontek, LLC

(57) ABSTRACT

Apparatus for dispensing a post-mix beverage is characterized by a beverage concentrate metering system comprising a reservoir of beverage concentrate, a disposable pump unit containing a pair of piston pumps and inlet and outlet valves from each piston pump. The inlet valves are coupled to the reservoir of beverage concentrate and the outlet valves are coupled to a mixer. A control valve introduces diluent to the concentrate intermediate the outlet valves and mixer and a reusable pump drive operates the piston pumps. The control valve and pump drive are operated by a control system in a manner such that a predetermined ratio of diluent to concentrate is delivered to the mixer. Downstream from the mixture the admixture of diluent and concentrate is dispensed as a beverage into a cup.

21 Claims, 3 Drawing Sheets

BEVERAGE DISPENSER

FIELD OF THE INVENTION

This invention relates to beverage dispensers, and more specifically to dispensers for dispensing a diluted beverage concentrate.

BACKGROUND OF THE INVENTION

Beverage dispensers for juice, particularly for orange juice, are required to pump a high viscosity juice concentrate and accurately control the ratio of juice concentrate to diluent to produce a beverage of uniform standard. Such dispensers commonly comprise a diluent inlet line from a pressurised diluent source, a juice concentrate reservoir and means for delivering concentrate from the reservoir to the dispenser, which delivering means customarily comprises one of means for pressurising the concentrate reservoir and controlling the flow of concentrate through a valve, means for pumping concentrate from the reservoir and controlling the flow through a valve, or means for volumetrically pumping concentrate from the reservoir. It is known that there are advantages to having a juice concentrate delivery system in which those parts of the system that contact the concentrate are disposable in order to maintain sanitation and reducing the risk of contamination through substandard cleaning of the system.

To improve sanitation in the delivery of juice concentrate from a concentrate reservoir to a juice dispenser the art contemplates use of a rotary peristaltic pump to deliver the concentrate, a deformable tube of which pump forms an integral part of a disposable concentrate reservoir, and use of a positive displacement pump that includes a disposable piston-type pump portion supplied with the concentrate reservoir and a non-disposable drive for reciprocating the pump to draw fluid into and expel it from the disposable pump, as shown in U.S. Pat. Nos. 5,114,047 and 5,154,319.

Peristaltic pumps provide a reasonable solution for sanitation problems, but often experience problems pumping higher viscosity fluids such as juice concentrate, and as the viscosity of juice concentrate can be highly dependant on its temperature, peristaltic systems often do not dispense a correct ratio of juice concentrate to diluent at lower temperatures. In addition, the tube part of the pump often deforms to a permanent set over time, such that the volumetric output towards the end of its life is less than that at the beginning of its life, again affecting the ratio of the mix of concentrate to diluent.

Positive displacement pumps, such as that in U.S. Pat. No. 5,114,047, produce a more constant ratio of the mix of juice concentrate to diluent, but because they have a fill cycle and a dispense cycle, the beverage will have a stratified appearance as it exits the dispenser as a result of the concentrate being intermittently dispensed into the diluent stream.

OBJECT OF THE INVENTION

A primary object of the invention is to provide a beverage dispenser incorporating a relatively inexpensive piston pump having a disposable pumping portion that is incorporated into a concentrate cartridge and that is capable of pumping high viscosity concentrate at a substantially continuous flow rate.

SUMMARY OF THE INVENTION

In accordance with the present invention, apparatus for dispensing a post-mix beverage comprises a reservoir of beverage concentrate; a disposable pump unit including a pair of piston pumps having inlet means fluid coupled to beverage concentrate in the reservoir and outlet means; and pump drive means for being coupled to the disposable pump unit for operating the pump unit to pump concentrate from the inlet means to the outlet means. Also included is a mixer fluid coupled to the pump unit outlet means; a control valve having an inlet for being fluid coupled to a supply of diluent for the beverage concentrate and an outlet for being fluid coupled to introduce diluent to beverage concentrate intermediate the disposable pump outlet means and the mixer; and control system means. The control system means operates the pump drive means and the control valve to provide a predetermined ratio of diluent to concentrate as delivered to the mixer.

The invention also contemplates a method of dispensing a post-mix beverage, which method comprises the steps of providing a reservoir of beverage concentrate; fluid coupling an inlet to a pair of piston pumps of a disposable pump unit to beverage concentrate in the reservoir; and fluid coupling an outlet from the pair of piston pumps to a mixer. Also included are the steps of connecting a pump drive to the disposable pump unit to operate the piston pumps; controlling the pump drive to reciprocate pistons of the pair of piston pumps of the disposable pump unit to pump beverage concentrate from the inlet to the pair of piston pumps to the outlet from the pair of piston pumps; delivering beverage concentrate from the outlet from the piston pumps to a mixer; and fluid coupling diluent for the beverage concentrate from a supply of diluent through a control valve to the beverage concentrate being delivered to the mixer to introduce diluent to the concentrate. Further included is the step of controlling operation of the pump drive and the control valve so that a predetermined ratio of diluent to beverage concentrate is delivered to the mixer.

The foregoing and other objects, advantages and features of the invention will become apparent from a consideration of the following detailed description when taken in conjunction with the accompanying drawings.

BRIEF DESCRIPTION OF THE DRAWINGS

Embodiments of the invention will now be described, by way of example only, with reference to the accompanying drawings in which.

DETAILED DESCRIPTION

Figure 1:
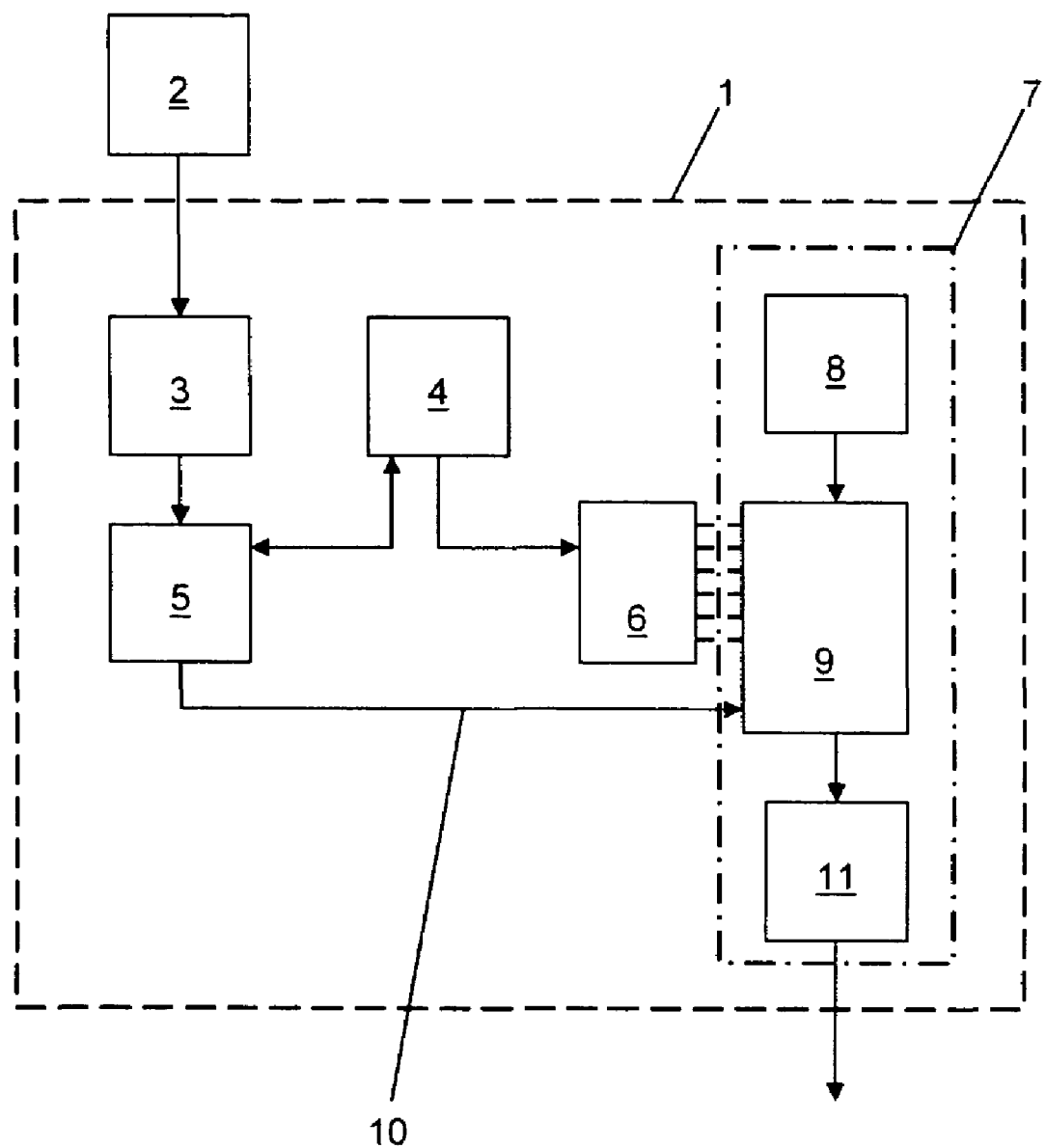
FIG. 1 is a schematic diagram of a dispenser in accordance with the invention.

Referring to FIG. 1, a schematic diagram of a beverage dispenser 1 connected to a diluent supply 2, which may be a supply of mains water. When the diluent enters the dispenser it is cooled in a cooling unit 3 to the required temperature for a beverage, commonly in the region of about 35° F. to 43° F. The cooling unit 3 may be a water bath heat exchanger or other type of cooling technology known in the art, such as a cold plate. An electronic controller 4 receives signals from a diluent flow measurement device (not shown) that may be part of a control valve 5 through which passes cooled diluent from the cooling unit 3. Electronic controller 4 operates both the control valve 5 and a pump drive 6 in a manner to bring together cooled diluent and juice concentrate in a predetermined ratio for being mixed together and dispensed as a beverage. Situated within or attached to dispenser 1 is a disposable concentrate unit 7. The concentrate unit 7 comprises a concentrate reservoir 8, a twin barrel piston pump cartridge 9 driven by the pump drive 6 and connected to and for receiving juice concentrate from the concentrate reservoir 8, a diluent conduit 10 fluid coupled to an outlet from the control valve 5 for delivering cooled diluent to the concentrate unit 7 for introduction to juice concentrate delivered from the piston pump cartridge 9, and a static mixer 11 for mixing the juice concentrate and diluent to form a homogeneous mixture.

Figure 2:
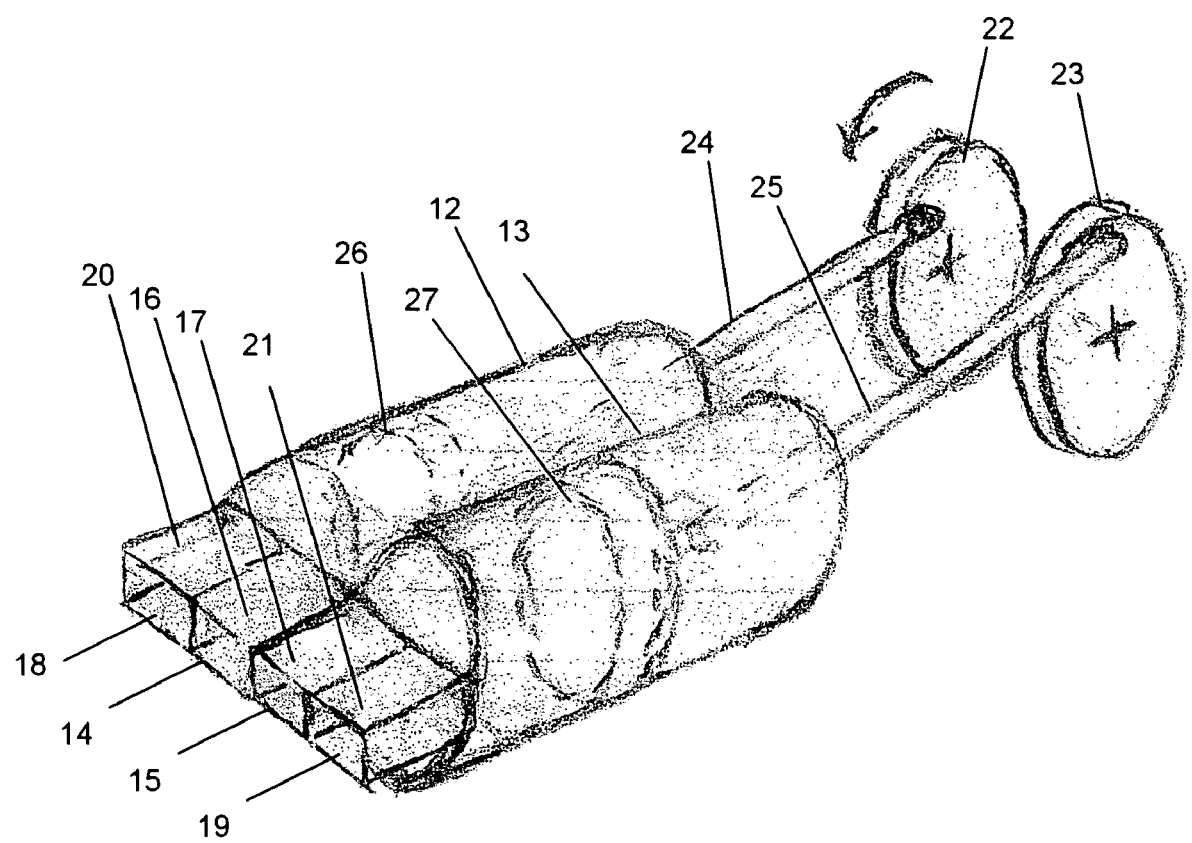
FIG. 2 is a perspective view of a twin barrel syringe pump for use in the invention.

FIG. 2 shows an output from the non-disposable pump drive 6 mechanically coupled to the twin barrel piston pump cartridge 9. A contemplated embodiment of the twin barrel piston pump 9 comprises two syringe type pump cylinders or barrels 12 and 13 that have associated inlets 14 and 15 fluid coupled to juice concentrate in the concentrate reservoir 8. The pump inlets 14 and 15 are provided with respective inlet check valves 16 and 17 that allow flow of concentrate from the concentrate reservoir 8 through the inlets into the pump barrels 12 and 13, but prevent backflow of concentrate out of the barrels through the inlets. The barrels 12 and 13 also have associated outlets 18 and 19 fluid coupled to the static mixer 11. The outlets 18 and 19 are provided with respective outlet check valves 20 and 21 that allow flow of concentrate from the barrels through the outlets to the static mixer 11, but prevent a reverse flow of concentrate back through the outlets.

In operation of the concentrate pumping mechanism, a pair of rotary cams 22 and 23 is coupled to an output from the pump drive 6 for being rotated by the pump drive. The cams 22 and 23 are also coupled via interface means comprising associated piston or cam rods 24 and 25 to respective ones of a pair of plungers or pistons 26 and 27 disposed for reciprocation in respective cylinders 12 and 13. Operation of the pump drive 6 therefore rotates the cams 22 and 23 to reciprocate the pistons 26 and 27 in both directions in the piston pump barrels 12 and 13 to thereby alternatively draw concentrate into the barrels through the check valves 16 and 17 and to eject fluid out of the barrels through the check valves 20 and 21. The arrangement advantageously is such that the directions of reciprocation of the pistons 26 and 27 through the cylinders 12 and 13 are 180° out of phase, so that while the plunger 26 is being drawn back through the barrel 12 to draw fluid into the barrel through the inlet 14 and the check valve 16, the plunger 27 is being driven forward through the barrel 13 to expel fluid from the barrel through outlet 19 and check valve 21. The cams 22 and 23 may be rotated together at a constant speed but, preferably, the rate of rotation of each cam is independently controlled and the speed of rotation is modulated, so that the plungers 26 and 27 are withdrawn through the barrels 12 and 13 at a faster rate than they are driven forward through the barrels, thereby to enable whichever barrel 12 or 13 is not then dispensing fluid to be fully filled with fluid and ready to dispense before the barrel that is then dispensing fluid is at the end of its dispensing stroke. The result is that the twin barrel piston pump 9 delivers to the mixer 11 a substantially constant and uninterrupted output flow of concentrate during a beverage dispense cycle.

Figure 3:
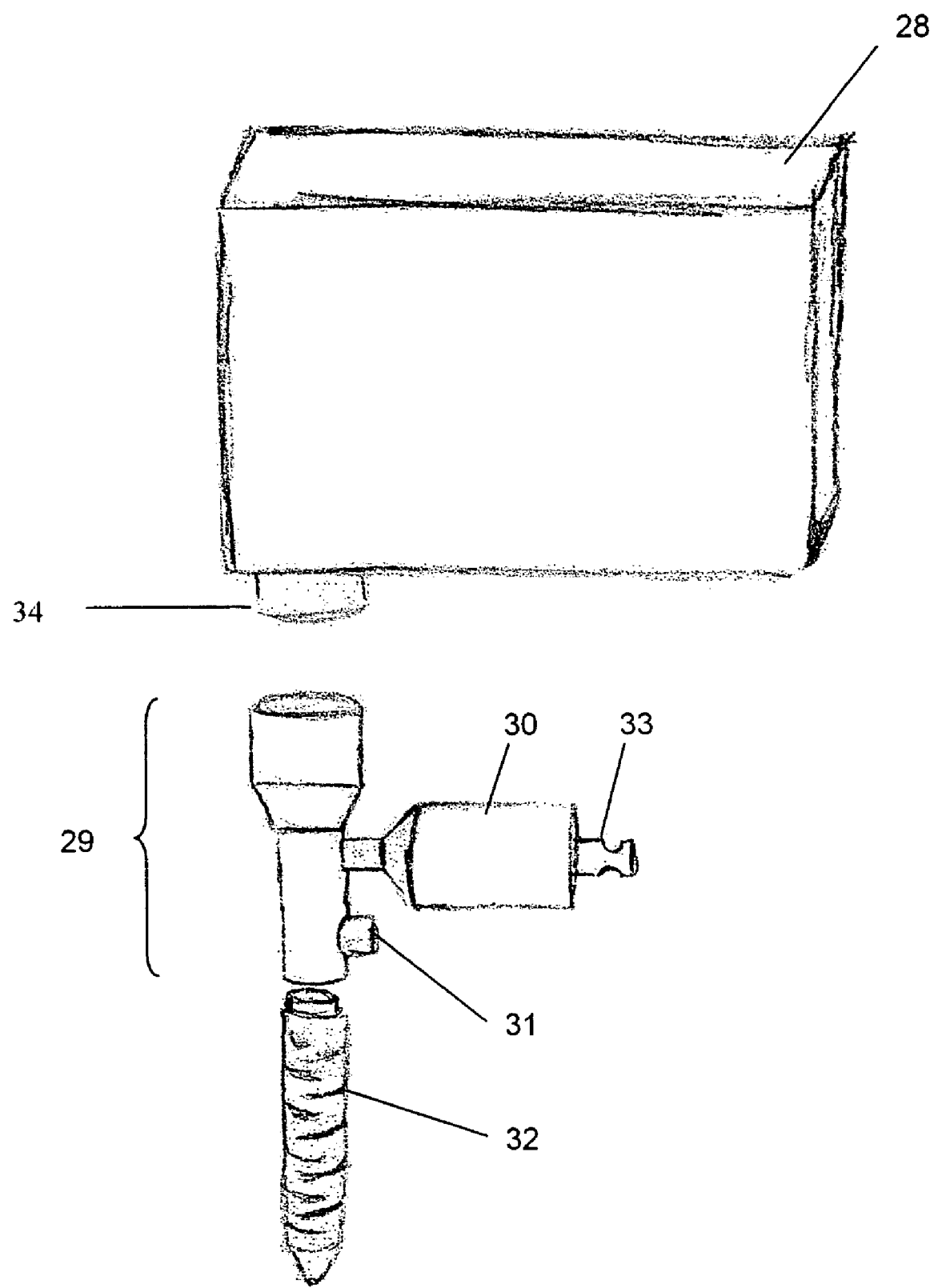
FIG. 3 is an exploded diagram of a concentrate reservoir, pump and mixing element for use in a dispenser of the invention.

FIG. 3 shows a disposable liquid juice concentrate reservoir 28 that is connectable to a disposable twin barrel piston pump element or cartridge 29. The pump element 29 includes a twin barrel piston pump 30 of a type heretofore described, for pumping the juice concentrate received from the reservoir 28. A water inlet 31 through which a moderated flow of water is passed from the control valve 5, provides for introduction of diluent to concentrate discharged from the pump 30. The control valve 5 and the pump drive 6 are operated by the control electronics 4 in such manner as to provide, upstream of a mixer 32, the bringing together of a predetermined constant ratio of diluent to juice concentrate, depending upon the particular beverage to be served by the dispenser 1. The concentrate and water diluent are then flowed together through a static mixer 32 to provide a substantially homogeneous mixture of diluted concentrate which is dispensed into a receptacle in a conventional know manner. In the arrangement shown in this FIG. 3 the disposable twin barrel piston pump 30 has plunger extensions 33 removably connectable to a pump driver, such as the pump drive 6. The reservoir 28 has an outlet 34 to which one or more inlets to the disposable pump element 29 are connected for receiving concentrate. The reservoir outlet 34 is provided with a protective cap or film (not shown) to cover and seal it during storage and transport.

It is appreciated that because the drive system reciprocates the pistons 26 and 27 alternately through their pumping strokes in the barrels 12 and 13 of the disposable twin barrel piston pump cartridge 9, the pump provides a substantially constant and uninterrupted output flow of juice concentrate during a beverage dispense cycle. Also, because the juice concentrate flows primarily through the disposable concentrate unit 7, which includes the disposable concentrate reservoir 8, twin piston pump cartridge 9 and static mixer 11, the juice concentrate comes into contact primarily with disposable parts, so that there are a minimum of non-disposable dispenser parts to be cleaned of juice concentrate, which provides for improved sanitation. When the reservoir of juice concentrate 8 is exhausted, the concentrate unit 7 is simply removed and replaced with a fresh concentrate unit having a full concentrate reservoir 8, so there is no need to be concerned with cleaning the previously used concentrate reservoir 8, twin barrel piston pump cartridge 9 and mixer 11.

Advantageously, because the pump drive 6 is controllable to operate independently on the two pistons 26 and 27 of the disposable pump element 9 to enable the pump fill cycle to be performed in a shorter time than the pump discharge cycle, provision can be made for a desired amount of overlap in the pumping actions of the two pump barrels, so that there is substantially no perceptible change in concentrate output from the pump as the output flow changes from one barrel to the other. The rotary motion of the cams 22 and 23 as driven by the pump drive 6 is translated into linear motion of the pistons 26 and 27, such that control of the motion of the pistons can be dictated by control of the relative individual speeds at which the cams are rotated. Alternatively, an arrangement is contemplated where outer ends of the piston rods 24 and 25 would ride on outer peripheral cam surfaces of the cams 22 and 23, in which case the cams could be rotated at the same speed with the speed of fill and dispense of the barrels 12 and 13 of the pump element 9 then being controlled by the profile of the cam surfaces.

It is understood that the dispenser 1 has a user interface and can be programmed to operate the control valve 5 and the pump drive 6 to either dispense beverages of selected sizes or to accommodate a continuous pour mode in which the dispenser continuously dispenses a beverage until signalled to stop. Preferably, an input signal is provided to the control electronics 4 when a new concentrate unit 7 is installed with a full concentrate reservoir 8, either by means of a user manually inputting a signal, for instance by pressing a reset button, or automatically by identification means on the concentrate unit, for instance an RFID tag on the concentrate reservoir and an associated reader in the dispenser 1. The input signal would be used to initiate a drinks countdown, such that when there is only a specific amount of concentrate remaining, as determined by the size and number of drinks served, an indication is given to the operator that the concentrate will soon need replacing, with a second signal being sent to the operator when the concentrate reservoir is empty. These signals may take the form of warning lights of different colours or they could comprise a countdown of remaining drinks to be dispensed. In addition, control of the concentrate flow rate can initially be set in accordance with the parameters of the particular concentrate used. Such parameters may be stored in a memory of the control electronics 4 of the dispenser 1 or, alternatively, may be automatically input to the dispenser for each concentrate reservoir as it is installed, for example by means of data stored in a RFID tag or input by an operator manually or via a handheld device.

Further, while the invention has been described as having the concentrate reservoir 8 and disposable twin barrel piston pump cartridge be part of a single unitary component, i.e., the concentrate unit 7, it is contemplated that the concentrate reservoir and disposable pump cartridge be supplied as two separate parts which are connected together either immediately prior to or during installation into the dispenser. Preferably, once the disposable pump cartridge 9 and juice concentrate reservoir 8 have been connected they cannot be disconnected, thus preventing reuse of the pump cartridge. However, should the pump cartridge and reservoir be capable of disconnection for reuse of the pump cartridge, then a limitation is placed on the number of times the pump cartridge can be reused.

While embodiments of the invention have been described in detail, various modifications and other embodiments thereof may be devised by one skilled in the art without departing from the spirit and scope of the invention, as defined in the appended claims.

What is claimed is:

1. A method of dispensing a post-mix beverage from a beverage dispenser, comprising the steps of providing a container of beverage concentrate connected to a disposable pump unit that includes a twin barrel piston pump, including a first barrel having a first inlet thereto, a first outlet therefrom and a first piston reciprocable therein and a second barrel having a second inlet thereto, a second outlet therefrom and a second piston reciprocable therein; fluid coupling the first and second barrel inlets to the container of beverage concentrate via at least one inlet valve; using a non-disposable drive system to reciprocate the first piston in the first barrel in one direction in a fill cycle to draw the beverage concentrate into the first barrel from the container via the first inlet and the at least one inlet valve and then in an opposite direction in an emptying cycle to eject the beverage concentrate from the first barrel via the first outlet and to reciprocate the second piston in the second barrel in one direction in a fill cycle to draw the beverage concentrate into the second barrel from the container via the second inlet and the at least one inlet valve and then in an opposite direction in an emptying cycle to eject the beverage concentrate from the second barrel via the second outlet; operating the drive system to reciprocate the first and second pistons such that at least one of the first and second pistons is always moving in the direction in the first and/or second barrel to eject the beverage concentrate from the first and/or second barrel to provide a substantially constant and uninterrupted output flow of the beverage concentrate from the twin barrel piston pump during a dispense cycle; introducing a flow of chilled diluent to the output flow of the beverage concentrate ejected from the twin barrel piston pump; controlling at least one of the drive system for the twin barrel piston pump and the flow of the diluent introduced to the output flow of the beverage concentrate to achieve a predetermined ratiometric mixture of the diluent to the beverage concentrate; passing the mixture of the diluent and beverage concentrate through a mixer to provide a substantially homogeneous mixture of the the diluent and of the beverage concentrate for dispensing from the dispenser into a receptacle; and upon exhaustion of the beverage concentrate in the container, replacing the container with a fresh container of the beverage concentrate, wherein said step of operating the drive system reciprocates the first and second pistons such the emptying cycles of the pistons overlap to provide a substantially continuous output flow of the beverage concentrate from the first and second barrels.

2. A method of dispensing a post-mix beverage according to claim 1, wherein said step of operating the drive system to reciprocates the first and second pistons such the emptying cycles of the pistons overlap to provide a substantially continuous output flow of the beverage concentrate from the first and second barrels reciprocates each of the first and second pistons independently so that the fill cycle of each of the first and second pistons are performed in a shorter time than the emptying cycles of each of the first and second pistons.

3. A method of dispensing a post-mix beverage according to claim 1, wherein said step of using a non-disposable drive system includes using rotating cranks to reciprocate the first and second pistons.

4. A method of dispensing a post-mix beverage according to claim 1, wherein said controlling step controls the outlet flow of the beverage concentrate from the twin barrel piston pump by controlling the drive system to vary the speed of reciprocation of the first and second pistons of the pump.

5. A method of dispensing a post-mix beverage according to claim 1, including the step of programming the dispenser to dispense a beverage of a known size.

6. A method of dispensing a post-mix beverage according to claim 1, including the step of operating the dispenser to continuously dispense a beverage for as long as said dispenser operating step is performed.

7. A method of dispensing a post-mix beverage according to claim 1, including the steps of automatically identifying selected characteristics of the beverage concentrate in the container, and modifying performance of said step of controlling at least one of the drive system for the twin barrel piston pump and the flow rate of the diluent introduced to the beverage concentrate to achieve a predetermined ratiometric mixture of the diluent to the beverage concentrate in accordance with the identified selected characteristics.

8. A method of dispensing a post-mix beverage according to claim 1, including the steps, of generating a signal indicative of performance of said replacing step in response to occurrence of said generating step, generating an indication of a number of beverages available to be dispensed from the fresh container of the beverage concentrate; reducing the indication of the number of beverages available to be dispensed in response to the dispensing of beverages; and, when an indication is generated that there are only a predetermined number of beverages remaining to be dispensed from the container, generating a signal to inform a user of the dispenser that the container of the beverage concentrate will soon need replacing.

9. A method of dispensing a post-mix beverage according to claim 1, wherein the twin barrel piston pump includes first and second piston rods respectively coupled to the first and second pistons and said step of using a non-disposable drive system includes the steps of engaging a each of the first and second piston rods with a cam surface of an associated one for first and second cams; rotating each of the first and second cams at the same constant speed; and providing each of the first and second cams with a selected cam profile so that the relative motions of the first and second pistons are determined by the profiles of the first and second cams.

10. A method of dispensing a post-mix beverage according to claim 1, including the steps of pre-programming the dispenser to dispense selected different sizes of beverages.

11. A method of dispensing a post-mix beverage according to claim 10, including the step of operating the dispenser to continuously dispense the beverage for as long as said dispenser operating step is performed.

12. A method of dispensing a post-mix beverage according to claim 1, including the steps, upon exhaustion of the beverage concentrate in the container, of replacing the container with a fresh container of beverage concentrate; and generating a signal indicative of performance of said replacing step.

13. An apparatus for dispensing a post-mix beverage, comprising diluent supply means; beverage concentrate supply means; a beverage concentrate supply and metering system, said system including a disposable pump unit including inlet valve means for connection to said beverage concentrate supply means, first and second pistons disposed for reciprocation in respective first and second barrels, and outlet valve means for delivery of beverage concentrate from said first and second barrels; a non-disposable pump drive for reciprocating said first and second pistons in said first and second barrels to draw the beverage concentrate through said inlet valve means and into said first and second barrels in one direction of movement of the first and second pistons and to eject the beverage concentrate from said first and second barrels and through said outlet valve means in an opposite direction of movement of said first and second pistons; means for bringing together diluent from said diluent supply means with beverage concentrate delivered from said outlet valve means; a control system for controlling said diluent supply means and said beverage concentrate supply and metering system to bring together the beverage concentrate and diluent in a desired ratiometric mixture thereof; and means for mixing together the diluent and beverage concentrate and for dispensing the mixture from said apparatus, wherein said beverage concentrate supply means includes a container of the beverage concentrate and said disposable pump unit is an integral component of said container of the beverage concentrate for being replaced along with said container of the beverage concentrate when said container of the beverage concentrate is exhausted.

14. An apparatus according to claim 13, wherein said dispensing apparatus includes a user interface for allowing selection of a predetermined sized beverage to be dispensed, said control system controlling the ratiometric mixture of the beverage concentrate to diluent to produce a selected size drink at the desired ratiometric mixture.

15. An apparatus according to claim 13 wherein said dispensing apparatus includes a user interface to allow the user to select continuous dispense, starting dispense and stopping dispense as signaled by the user.

16. An apparatus according to claim 13 wherein said dispensing apparatus includes sensor means for detecting the presence of a receptacle positioned to be filled with beverage, and means responsive to said sensor means for initiating dispensing of the beverage.

17. Apparatus for dispensing a post-mix beverage, said apparatus comprising a reservoir of beverage concentrate; a disposable pump unit including first and second piston pumps having inlet means fluid coupled to the beverage concentrate in said reservoir and outlet means; pump drive means for being coupled to said disposable pump unit for operating said pump unit to pump the beverage concentrate from said inlet means and through said first and second piston pumps to said outlet means; a mixer fluid coupled to said pump unit outlet means; a control valve having an inlet for being fluid coupled to a supply of diluent for the beverage concentrate and an outlet for being fluid coupled to introduce the diluent to the beverage concentrate intermediate said disposable pump outlet means and said mixer; control system means for operating said pump drive means and said control valve to provide a predetermined ratio of the diluent to the beverage concentrate as delivered to said mixer; and wherein said reservoir of the beverage concentrate includes a container of the beverage concentrate and said disposable pump unit is an integral component of said container of the beverage concentrate for being replaced along with said container of the beverage concentrate when said container of the beverage concentrate is exhausted.

18. A method of dispensing a post-mix beverage, said method comprising the steps of providing a reservoir of beverage concentrate; fluid coupling an inlet to first and second piston pumps of a disposable pump unit to the beverage concentrate in the reservoir; fluid coupling an outlet from the first and second piston pumps to a mixer; connecting a pump driver to the disposable pump unit to operate the first and second piston pumps; controlling the pump driver to reciprocate first and second pistons of the respective first and second piston pumps of the disposable pump unit to pump the beverage concentrate from the inlet to the first and second piston pumps to the outlet from the first and second piston pumps; delivering the beverage concentrate from the outlet from the first and second piston pumps to a mixer; fluid coupling the diluent for the beverage concentrate from a supply of diluent through a control valve to the beverage concentrate being delivered to the mixer to introduce the diluent to the beverage concentrate; controlling operation of the pump drive and the control valve so that a predetermined ratio of the diluent to the beverage concentrate is delivered to the mixer; and, upon exhaustion of the beverage concentrate in the reservoir, replacing the reservoir with a fresh reservoir of beverage concentrate and replacing the disposable pump unit with a fresh disposable pump unit.

19. A method of dispensing a post-mix beverage from a beverage dispenser, comprising the steps of providing a container of beverage concentrate connected to a disposable pump unit that includes a twin barrel piston pump, including a first barrel having a first inlet thereto a first outlet therefrom and a first piston reciprocable therein and a second barrel having a second inlet thereto, a second outlet therefrom and a second piston reciprocable therein; fluid coupling the first and second barrel inlets to the container of the beverage concentrate via at least one inlet valve; using a non-disposable drive system to reciprocate the first piston in the first barrel in one direction in a fill cycle to draw the beverage concentrate into the first barrel from the container via the first inlet and the at least one inlet valve and then in an opposite direction in a emptying cycle to eject the beverage concentrate from the first barrel via the first outlet and to reciprocate the second piston in the second barrel in one direction in a fill cycle to draw the beverage concentrate into the second barrel from the container via the second inlet and the at least one inlet valve and then in an opposite direction in an emptying cycle to eject the beverage concentrate from the second barrel via the second outlet; operating the drive system to reciprocate the first and second pistons such that at least one of the first and second pistons is always moving in the direction in the first and/or second barrel to eject the beverage concentrate from the associated first and/or second barrel to provide a substantially constant and uninterrupted output flow of the beverage concentrate from the twin barrel piston pump during a dispense cycle; introducing a flow of chilled diluent to the output flow of the beverage concentrate ejected from the twin barrel piston pump; controlling at least one of the drive system for the twin barrel piston pump and the flow of the diluent introduced to the output flow of the beverage concentrate to achieve a predetermined ratiometric mixture of the diluent to the beverage concentrate; passing the mixture of the diluent and beverage concentrate through a mixer to provide a substantially homogeneous mixture of the diluent and of the beverage concentrate for dispensing from the dispenser into a receptacle; and, upon exhaustion of the beverage concentrate in the container, replacing the container with a fresh container of a beverage concentrate and the disposable pump unit with a fresh disposable pump unit.

20. Apparatus for dispensing a post-mix beverage, comprising: a disposable pump unit, said disposable pump unit including a twin barrel piston pump having a first barrel with a first inlet thereto, a first outlet therefrom and a first piston reciprocable therein, and a second barrel with a second inlet thereto, a second outlet therefrom and a second piston reciprocable therein; at least one inlet valve; means for fluid coupling said first and second barrel inlets to a container of beverage concentrate via said at least one inlet valve; a non-disposable drive system for reciprocating said first piston in said first barrel in one direction in a fill cycle to draw the beverage concentrate into said first barrel from the container of the beverage concentrate via said first inlet and said at least one inlet valve and then in an opposite direction in a emptying cycle to eject the beverage concentrate from said first barrel via said first outlet and to reciprocate said second piston in said second barrel in one direction in a fill cycle to draw the beverage concentrate into said second barrel from the container of the beverage concentrate via said second inlet and said at least one inlet valve and then in an opposite direction in an emptying cycle to eject the beverage concentrate from said second barrel via said second outlet; means for operating said drive system to reciprocate said first and second pistons such that at least one of said first and second pistons is always moving in the direction in the associated first and second barrel to eject the beverage concentrate from the associated first and second barrel to provide a substantially constant and uninterrupted output flow of the beverage concentrate from said twin barrel piston pump during a dispense cycle; means for fluid coupling a mixer to said first and second outlets; means for introducing a flow of chilled diluent to the output flow of the beverage concentrate ejected from said twin barrel piston pump upstream from said mixer; and means for controlling at least one of said drive system for said twin barrel piston pump and said means for introducing to achieve a predetermined ratiometric mixture of the diluent to the beverage concentrate for passage of the mixture through said mixer, said mixer providing a substantially homogeneous mixture of the diluent and the beverage concentrate for dispensing, wherein said operating means operates said drive system to reciprocate said first and second pistons such that said emptying cycles of said pistons overlap to provide a substantially continuous output flow of the beverage concentrate from said first and second barrels.

21. An apparatus according to claim 20, wherein said operating means operates said drive system to reciprocate each of said first and second pistons independently so that said fill cycle of each of said first and second pistons is performed in a shorter time than said emptying cycle of each of said first and second pistons.

* * * * *

UNITED STATES PATENT AND TRADEMARK OFFICE
CERTIFICATE OF CORRECTION

| | |
|---|---|
| PATENT NO. | : 7,331,483 B2 |
| APPLICATION NO. | : 10/926491 |
| DATED | : February 19, 2008 |
| INVENTOR(S) | : Alan Bhimani, Richard Nighy and Hugh Christopher Bramley |

Page 1 of 1

It is certified that error appears in the above-identified patent and that said Letters Patent is hereby corrected as shown below:

Column 6, line 16, delete the second occurrence of "the"

Column 9, line 15, delete "associated"

Signed and Sealed this

Twenty-fourth Day of June, 2008

JON W. DUDAS
*Director of the United States Patent and Trademark Office*